US010962764B2

(12) United States Patent
Hirshberg et al.

(10) Patent No.: US 10,962,764 B2
(45) Date of Patent: Mar. 30, 2021

(54) LASER PROJECTOR AND CAMERA

(71) Applicant: Intel Corporation, Santa Clara, CA (US)

(72) Inventors: Arnon Hirshberg, Misgav (IL); Ohad Menashe, Haifa (IL); Barak Freedman, Yokneam (IL); Nikolai Berkovitch, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1062 days.

(21) Appl. No.: 15/089,157

(22) Filed: Apr. 1, 2016

(65) Prior Publication Data

US 2017/0285936 A1 Oct. 5, 2017

(51) Int. Cl.
| | |
|---|---|
| *G09G 3/00* | (2006.01) |
| *G02B 26/08* | (2006.01) |
| *G02B 27/10* | (2006.01) |
| *G09G 3/02* | (2006.01) |
| *G01B 11/24* | (2006.01) |
| *G06F 3/042* | (2006.01) |
| *G09G 3/34* | (2006.01) |

(52) U.S. Cl.
CPC .......... *G02B 26/0833* (2013.01); *G01B 11/24* (2013.01); *G02B 27/104* (2013.01); *G06F 3/0423* (2013.01); *G09G 3/003* (2013.01); *G09G 3/025* (2013.01); *G09G 3/346* (2013.01); *G09G 2360/142* (2013.01)

(58) Field of Classification Search
CPC ............................... G09G 3/003; G09G 3/346
See application file for complete search history.

(56) References Cited

U.S. PATENT DOCUMENTS

| | | | | |
|---|---|---|---|---|
| 2006/0238660 | A1* | 10/2006 | Takeda ............... | G03B 21/2033 348/801 |
| 2009/0003836 | A1* | 1/2009 | Wang ................. | G02B 26/0808 398/156 |
| 2010/0315605 | A1 | 12/2010 | Arita | |
| 2011/0018986 | A1 | 1/2011 | Sprague et al. | |
| 2011/0235003 | A1 | 9/2011 | Konno | |
| 2011/0249197 | A1* | 10/2011 | Sprowl ............. | G02B 27/0905 348/744 |

(Continued)

FOREIGN PATENT DOCUMENTS

JP 2006343464 A 12/2006

OTHER PUBLICATIONS

PCT International Search Report, PCT Application No. PCT/US2017/015967, dated May 12, 2017, 4 pages.

(Continued)

*Primary Examiner* — Kent W Chang
(74) *Attorney, Agent, or Firm* — Hanley, Flight & Zimmerman LLC

(57) ABSTRACT

An optical system including multiple lenses to receive respective laser beams, and including a combiner (an optical device) to receive the laser beams from the multiple lenses and to combine the laser beams into a single beam. The optical assembly includes a micro-electro-mechanical system (MEMS) mirror to reflect the single beam from the combiner and provide a reflected beam as an exit beam through a window to an object. The optical assembly includes a single-pixel photodetector to collect light reflected from the object.

20 Claims, 5 Drawing Sheets

(56) References Cited

U.S. PATENT DOCUMENTS

| | | | |
|---|---|---|---|
| 2014/0034806 A1* | 2/2014 | Vincen | G03B 21/2086 |
| | | | 250/205 |
| 2015/0189245 A1 | 7/2015 | Dekker et al. | |
| 2016/0011311 A1* | 1/2016 | Mushimoto | G02B 26/0816 |
| | | | 250/236 |
| 2016/0231549 A1* | 8/2016 | Bosworth | G02B 21/008 |

OTHER PUBLICATIONS

International Searching Authority, "International Preliminary Report on Patentability and Written Opinion," Issued in connection with International Patent Application No. PCT/US2017015967, dated Oct. 2, 2018, 11 pages.

* cited by examiner

300

400

LASER PROJECTOR AND CAMERA

TECHNICAL FIELD

The present techniques relate generally to laser projectors, and more particularly, to a laser projector utilizing a camera and image processing.

BACKGROUND ART

A factor in optoelectronic systems, such as laser scanners, projectors, and other laser devices, is a field of view (FOV) of a controlled deflection of laser beams, provided by scanning mirrors in the system. The FOV may be impacted by the mechanical form factor or physical dimensions of the system. Laser projector units embedded in mobile devices and other computing devices may have size constraints in order to fit into the mobile devices. Micro-electro-mechanical systems (MEMS) mirrors may be employed. Laser devices such as projector units with MEMS mirrors may be utilized.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
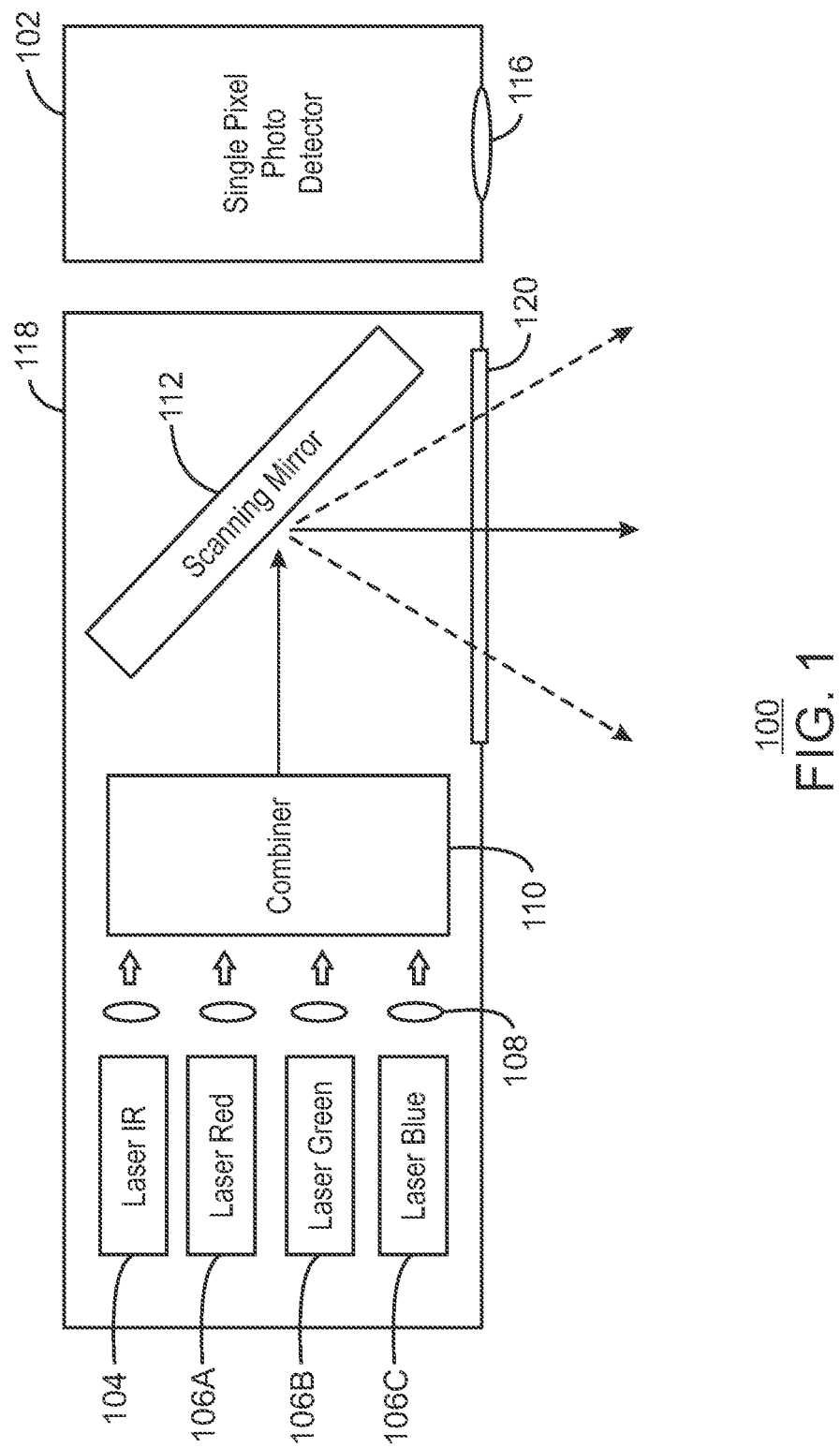
FIG. 1 is a diagram of an optical system.

The present techniques relate generally to laser projectors, and more particularly, to a laser projector utilizing a single-pixel camera and image processing. The present techniques may include an optical system having: multiple collimating lenses to receive respective laser beams; a combiner to receive the laser beams from the multiple collimating lenses and to combine the laser beams into a single beam; a micro-electro-mechanical system (MEMS) mirror to reflect the single beam from the combiner and provide an exit beam through a window to an object; and a single-pixel photodetector (or photo detector) to collect light reflected from the object. The single-pixel photodetector may be positioned "behind" the MEMS mirror such that the single-pixel photodetector is exposed only to a current projected pixel from the object. The detector may be physically "behind" or after the mirror of the returning/received optical path. The returning light hits the mirror and then the detector. Again, embodiments include a laser projector and camera (single-pixel camera), and are related to perceptual computing. In particular, embodiments may be related to depth camera, MEMS laser projector, red-green-blue (RGB) camera, single-pixel camera, and so forth. A laser projector may be a sophisticated and relatively expensive product which projects a two-dimensional (2D) image. In perceptual computing using a sensor, a 2D infrared (IR) image may be employed to calculate the image depth, for example, providing a three-dimensional (3D) image. Again, such may be accomplished using an IR camera and image processing.

Certain embodiments may expand implementation of the laser projector utilizing the laser projector hardware to enable more features (e.g., red-green-blue or RGB projector) and replacing the more expensive IR charge-coupled device (CCD) camera with a lower cost single-pixel detector, for instance. A product is a computer with a virtual interface employing a projected keyboard/keypad/picture that is depth activated, and in which a monitor or display screen (e.g., liquid crystal display or LCD) may be avoided.

A 2D laser projector may be employed in multiple purposes, e.g., an IR depth projector, a red-green-blue (RGB) projector, an IR/RGB single pixel camera, and so forth. By using a beam combiner, an RGB and IR lasers can be combined into one beam, and projected by the steering mirror, as discussed below. Such may provide an IR and RGB projected image at user request, for instance. When a single pixel photodetector, e.g., positive-intrinsic-negative or PIN diode, Avalanche Photodiode or APD, and so forth, is collecting the reflected light from the projected object—a captured image may be reconstructed, such as via an IR/RGB camera.

Some solutions do not have an IR plus RGB projection capability and, instead, there are discreet IR projectors and discreet RGB projectors. However, when utilizing the existing IR projectors hardware and adding RGB lasers, the product may have more features at a relatively small increase in cost in certain examples. Moreover, some solutions use an expensive CCD pixel array camera. In contrast, a single-pixel photodetector will generally provide cost reduction and simpler implementation. Present features may include a single pixel camera, RGB/IR, image projection (RGB/IR), depth image, and so on. Applications may include 3D object reconstructing, gesture recognition, image projection, IR camera, RGB camera, adaptive RGB image on 3D objects/RGB background (e.g., 3D RGB illusion image, coloring a 3D blank object, projecting a virtual keyboard/interface, portable computer without a screen etc.), and the like.

Embodiments provide for an IR laser projector (which creates a projected image) and a red-green-blue (RGB) laser projector (which creates a projected image). The laser projector may give a reconstructed 2D image from a single-pixel photodetector, a reconstructed 3D image (depth) from a single-pixel photodetector, and/or a reconstructed 2D multispectral/hyperspectral image from a single pixel photodetector, and the like.

FIG. 1 is an optical system 100 having a single-pixel photodetector 102 and an infrared (IR) laser 104. The system 100 further has a laser red 106A, laser green 106B, and laser blue 106C, which the three may be collectively referred to as a red-green-blue (RGB) laser 106 (e.g., RGB laser 310 in FIG. 3). The laser beams from lasers 104, 106A, 106B, and 106C flow through respective collimating lenses 108 and are combined at a combiner 110. The combiner 110 emits a combined optical beam (a single beam) to the scanning mirror 112 that reflects the beam. A window or lens 116 on the single-pixel photodetector 102 collects the reflected light from the projected object (not shown). One or more of the aforementioned components may be disposed or situated in a housing 118. The scanning mirror 112 may reflect the combined beam as exit beams through an opening or window 120 on the housing 118 to the object (not shown).

Thus, the RGB and IR lasers are collimated and combined to one optical beam. Again, the combined beam is projected on a scanning mirror 112 which steers the beam to the scene. The photodetector 102 collects the reflected light from the projected object. The lasers may be pulse-actuated where each pulse represents a pixel in the scene. The pixel location may be determined by the mirror 112 angle, for example. From the determined pixel location and the photodetector window 116 detected light intensity, an image can be reconstructed. When the time is measured from projection to receiving the light pulse, the range of each pixel may be obtained. Then, the range can be reconstructed to a depth image.

Certain embodiments provide for an improved signal-to-noise ratio (SNR) with the photodetector located "behind the mirror." In this location, the photodetector may "see" generally only the current projected pixel and not the entire or whole scene. The whole scene may be contaminated by ambient/sun light (or other light) which may flood the sensor with "light noise."

Figure 2:
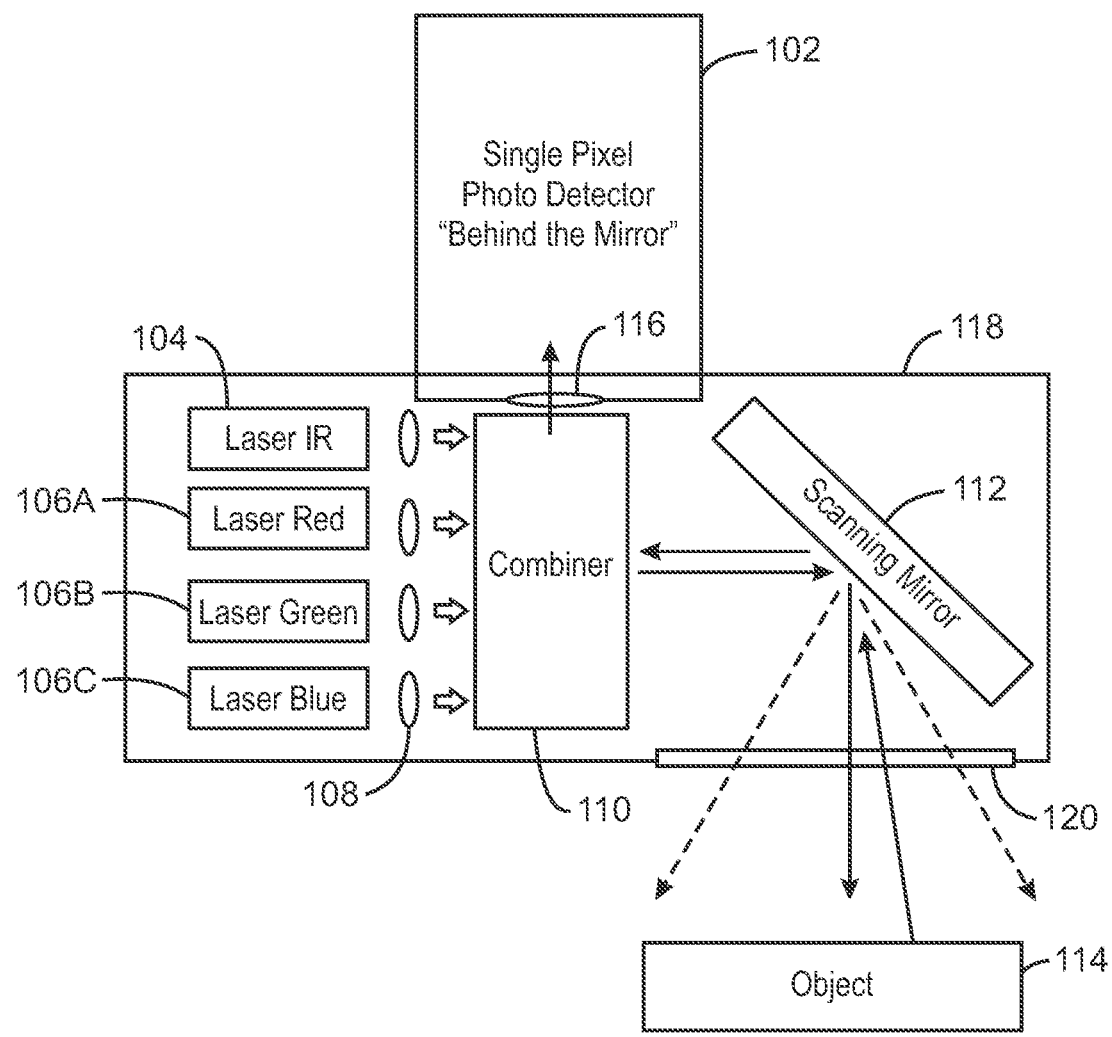
FIG. 2 is a diagram of an optical system in accordance with embodiments of the present techniques.

FIG. 2 is an optical system 200 (e.g., as an electronic device or component of an electronic device such as laser projector or computing device) and is similar to the optical system 100 of FIG. 1 but with the single-pixel photodetector 102 is rearranged to be disposed "behind the mirror." As mentioned, in this location, the photodetector 102 will generally only detect the current projected pixel. The system 100 has the infrared (IR) laser 104, laser red 106A, laser green 106B, and laser blue 106C. The laser beams from lasers 104, 106A, 106B, and 106C flow through respective collimating lenses 108 and are combined at a combiner 110. The combiner 110 emits a combined optical beam (a single beam) to the scanning mirror 112 that reflects the beam (as an exit beam). A window or lens 116 on the single-pixel photodetector 102 collects the reflected light from the project object 114. One or more of the aforementioned components may be disposed or situated in a housing 118. The scanning mirror 112 may reflect the combined beam as exit beams through an opening or window 120 on the housing 118 to the object 114. The unique combination of components and techniques may give resolution and frame rate flexibility at cost reduction. A single pixel IR/depth camera may be implemented in perceptual computing.

As indicated, the illustrated embodiment of FIG. 2 and similar embodiments may be employed as electronic devices (or a component of electronic devices) including laser projectors, computing devices, and so on. Again, embodiments provide for an IR laser projector (which creates a projected image) and a red-green-blue (RGB) laser projector (which creates a projected image). As noted, the electronic device or laser projector may give a reconstructed 2D image from a single-pixel photodetector, a reconstructed 3D image (depth) from a single pixel photodetector, and/or a reconstructed 2D multispectral/hyperspectral image from a single-pixel photodetector, and the like.

Indeed, a capability of acquiring single pixel multispectral image (or hyperspectral) may be provided. For example, by using a tunable laser (changing the projected color/wavelength), the acquired image may be at different colors accordingly. Thus, a multispectral image can be made. A multispectral image may be one that captures image data at specific frequencies across the electromagnetic spectrum. The wavelengths may be separated by filters or by the use of instruments that are sensitive to particular wavelengths, including light from frequencies beyond the visible light range, such as infrared. Spectral imaging can facilitate extraction of additional information the human eye fails to capture with its receptors for red, green and blue. Hyperspectral imaging is part of a class of techniques commonly referred to as spectral imaging or spectral analysis. Hyperspectral imaging is related to multispectral imaging. The distinction between hyper- and multi-spectral is sometimes based on an arbitrary "number of bands" or on the type of measurement. Hyperspectral imaging, like other spectral imaging, collects and processes information from across the electromagnetic spectrum. A goal of hyperspectral imaging may be to obtain the spectrum for each pixel in the image of a scene, with the purpose of finding objects, identifying materials, or detecting processes. Whereas the human eye sees color of visible light in mostly three bands (red, green, and blue), spectral imaging divides the spectrum into many more bands. This technique of dividing images into bands can be extended beyond the visible. In hyperspectral imaging, the recorded spectra have fine wavelength resolution and cover a wide range of wavelengths. Engineers build hyperspectral sensors and processing systems for applications in astronomy, agriculture, biomedical imaging, geosciences, physics, and surveillance.

Figure 3:
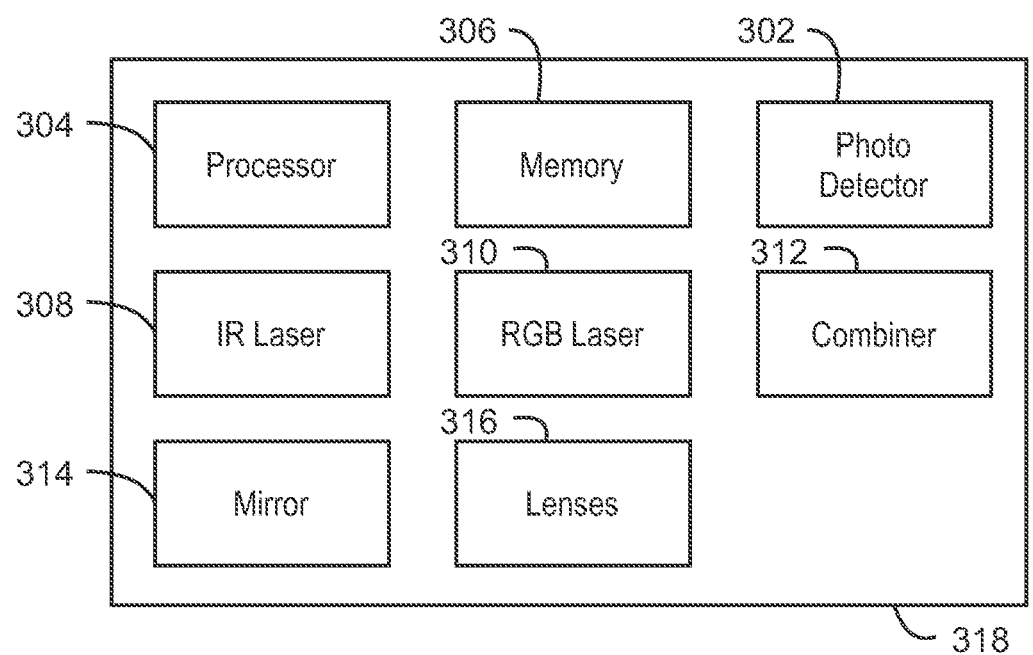
FIG. 3 is a block diagram of an electronic device in accordance with embodiments of the present techniques.

FIG. 3 is an electronic device 300 (e.g., computer, laser projector, etc.) having an optical system including a single-pixel photodetector 302. The device 300 may include a processor 304 (e.g., central processing unit or CPU) and memory 306. The memory 306 may include nonvolatile memory and volatile memory. The optical system or electronic device 300 (e.g., laser projector, smartphone, tablet, etc.) may include an IR laser 308 and an RGB laser 310. Further, device 300 may include a combiner 312, mirror 314, lenses 316, and other components. One or more of the aforementioned items may be disposed in a housing 318. While all of the aforementioned items are depicted within the housing 318, in other examples, some of the items may be outside the housing 318, such as in a different housing or disposition of the device 300. As indicated, the illustrated embodiment of FIG. 3 and similar embodiments (as well with reference to FIG. 4 and FIG. 5 discussed below), may be employed as electronic devices including laser projectors, computing devices, and so forth. The device may be or incorporate an IR laser projector (which creates a projected image) and a red-green-blue (RGB) laser projector (which creates a projected image). The device (e.g., laser projector) may be configured to give a reconstructed 2D image from a single-pixel photodetector, a reconstructed 3D image (depth) from a single-pixel photodetector, and/or a reconstructed 2D multispectral and/or hyperspectral image from a single pixel photodetector, etc.

Figure 4:
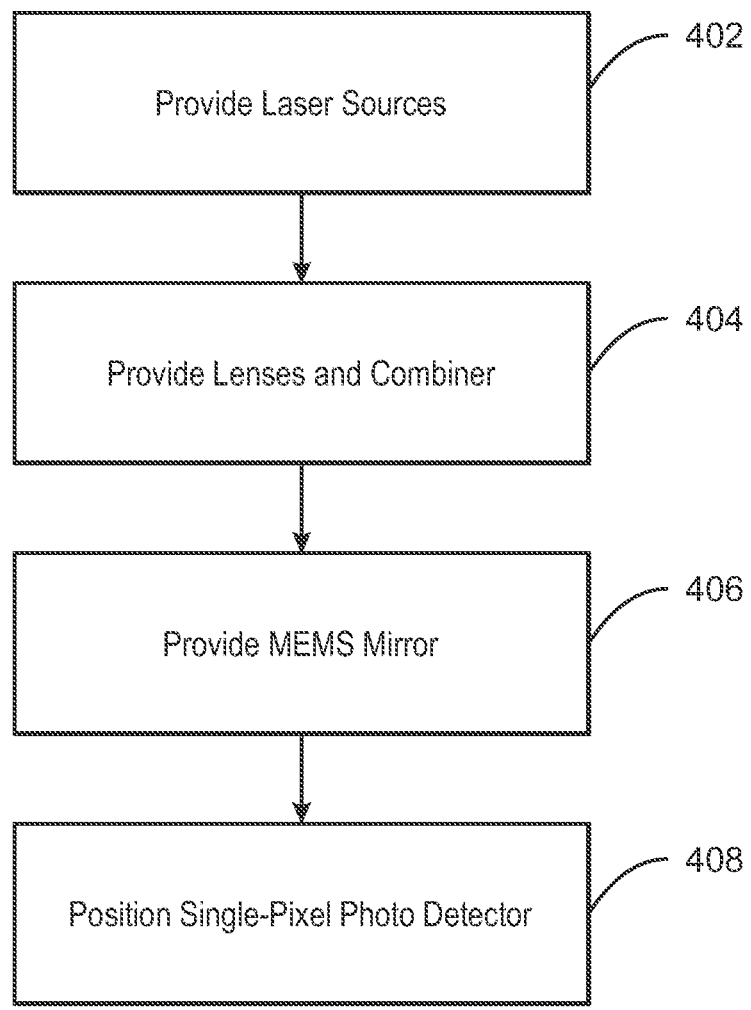
FIG. 4 is a block diagram of a method of manufacturing an optical system in accordance with embodiments of the present techniques.

FIG. 4 is a method 400 of fabricating an optical system. At block 402, laser sources are provided, such as an IR laser, RGB laser, and so on. At block 404, collimating lenses and a combiner are provided so that the laser beams from the laser sources will flow through a respective collimating lens and be combined into a single beam at the combiner. At block 406, a MEMS mirror is provided and configured to receive and reflect the single beam, such as an exit beam through a window to a projected object. At block 408, a single-pixel photodetector is positioned "behind the mirror" such that the single-pixel photodetector collects, detects, or senses only a current projected pixel from the object.

Figure 5:
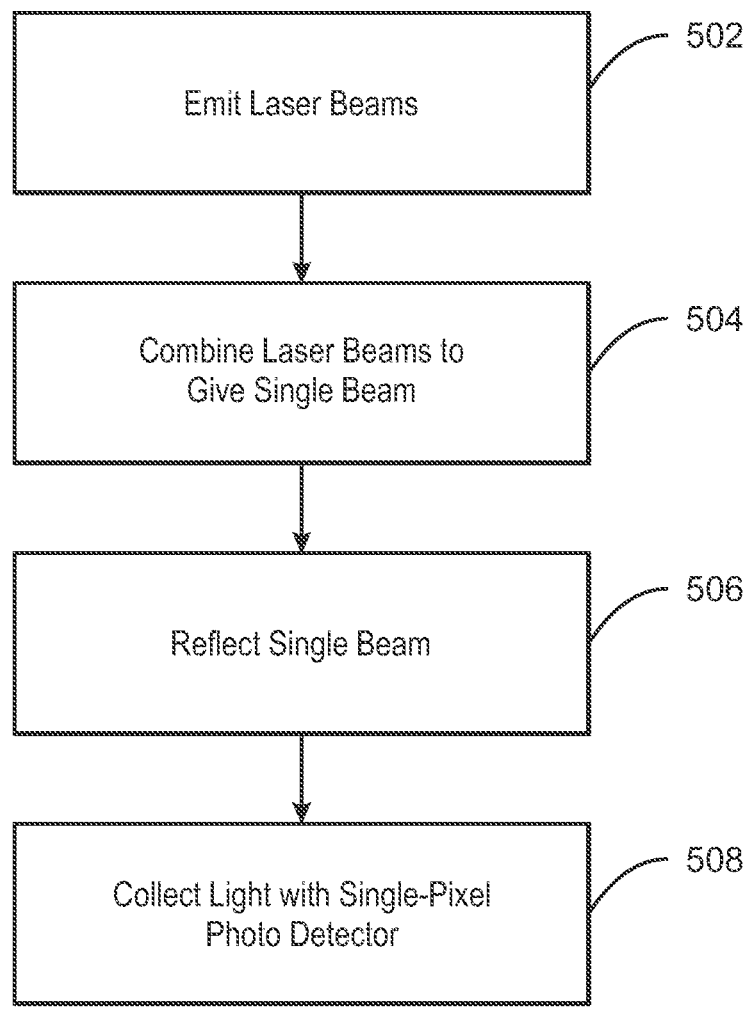
FIG. 5 is a block diagram of a method of operating an optical system in accordance with embodiments of the present techniques.

FIG. 5 is a method 500 of operating an optical system. At block 502, laser sources emit laser beams. At block 504, the laser beams pass through respective lenses (e.g., collimating lenses) and to a combiner where the laser beams are combined into a single beam. At block 506, the single beam from the combiner is received at a MEMS mirror that reflects the beam as an exit beam to an object. At block 508, a single-pixel photodetector positioned "behind the mirror" detects or collects the light reflected from the object.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment", "one embodiment", "some embodiments", "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Examples are given. Example 1 is an optical system. The system includes multiple lenses to receive respective laser beams; a combiner comprising an optical device to receive the laser beams from the multiple lenses and to combine the laser beams into a single beam; a micro-electro-mechanical system (MEMS) mirror to reflect the single beam from the combiner and provide a reflected beam comprising an exit beam through a window to an object; and a single-pixel photodetector to collect light reflected from the object.

Example 2 includes the system of example 1, including or excluding optional features. In this example, the single-pixel photodetector is positioned behind the MEMS mirror such that the single-pixel photodetector is exposed only to a current projected pixel from the object, and wherein the multiple lenses are collimating lenses.

Example 3 includes the system of any one of examples 1 to 2, including or excluding optional features. In this example, the respective laser beams comprise an infrared (IR) laser beam, a red laser beam, a green laser beam, and a blue laser beam.

Example 4 includes the system of any one of examples 1 to 3, including or excluding optional features. In this example, the system includes laser sources to provide the respective laser beams, wherein the laser sources comprise laser diodes comprising an infrared (IR) laser, a red laser, a green laser, and a blue laser.

Example 5 includes the system of any one of examples 1 to 4, including or excluding optional features. In this example, the MEMS mirror comprises a steering/scanning mirror, and wherein the single-pixel photodetector comprises a lens to collect light reflected from the object.

Example 6 includes the system of any one of examples 1 to 5, including or excluding optional features. In this example, the optical system is a component a laser projector to create a projected image.

Example 7 includes the system of any one of examples 1 to 6, including or excluding optional features. In this example, the optical system comprises a laser projector to give a reconstructed two-dimensional (2D) image from the single-pixel photodetector, wherein the 2D image comprises a multispectral image or hyperspectral image.

Example 8 includes the system of any one of examples 1 to 7, including or excluding optional features. In this example, the optical system comprises a laser projector to give a reconstructed three-dimensional (3D) image via the single-pixel photodetector.

Example 9 vis an electronic device. The electronic device includes a processor and memory; and an optical system comprising: multiple collimating lenses to receive respective laser beams; a combiner comprising an optical device to receive the laser beams from the multiple lenses and to combine the laser beams into a single beam; a micro-electro-mechanical system (MEMS) mirror to reflect the single beam from the combiner and provide a reflected beam comprising an exit beam through a window to an object; and a single-pixel photodetector to collect light reflected from the object.

Example 10 includes the electronic device of example 9, including or excluding optional features. In this example, the single-pixel photodetector is positioned behind the MEMS mirror such that the single-pixel photodetector is exposed only to a current projected pixel from the object and not an entire scene.

Example 11 includes the electronic device of any one of examples 9 to 10, including or excluding optional features. In this example, the respective laser beams comprise an infrared (IR) laser beam, a red laser beam, a green laser beam, and a blue laser beam.

Example 12 includes the electronic device of any one of examples 9 to 11, including or excluding optional features. In this example, the electronic device includes laser sources to provide the respective laser beams, wherein the laser sources comprise laser diodes comprising an infrared (IR) laser, a red laser, a green laser, and a blue laser.

Example 13 includes the electronic device of any one of examples 9 to 12, including or excluding optional features.

In this example, the MEMS mirror comprises a steering mirror, and wherein the single-pixel photodetector comprises a lens to collect the light reflected from the object.

Example 14 includes the electronic device of any one of examples 9 to 13, including or excluding optional features. In this example, the electronic device comprises a laser projector to create a projected image.

Example 15 includes the electronic device of any one of examples 9 to 14, including or excluding optional features. In this example, the electronic device comprises a laser projector to give a reconstructed two-dimensional (2D) image from the single-pixel photodetector, wherein the 2D image comprises a multispectral image or hyperspectral image.

Example 16 includes the electronic device of any one of examples 9 to 15, including or excluding optional features. In this example, the electronic device comprises a laser projector to give a reconstructed three-dimensional (3D) image via the single-pixel photodetector.

Example 17 includes the electronic device of any one of examples 9 to 16, including or excluding optional features. In this example, the electronic device comprises a computing device.

Example 18 is a method of manufacturing an optical system. The method includes disposing multiple collimating lenses to receive laser beams from laser diodes, respectively, and to discharge the laser beams to a combiner; providing the combiner to combine the laser beams into a single beam, wherein the combiner is an optical device; disposing a micro-electro-mechanical system (MEMS) steering mirror to reflect the single beam as an exit beam projected to an object; and positioning a single-pixel photodetector such that the single-pixel photodetector is exposed only to a current projected pixel from the object and not to an entire scene, wherein the single-pixel photodetector comprises a lens to collect the light reflected from the object.

Example 19 includes the method of example 18, including or excluding optional features. In this example, the laser beams comprise an infrared (IR) laser beam, a red laser beam, a green laser beam, and a blue laser beam.

Example 20 includes the method of any one of examples 18 to 19, including or excluding optional features. In this example, the method includes providing the laser diodes as an IR laser source, a red laser source, a green laser source, and a blue laser source, respectively.

Example 21 includes the method of any one of examples 18 to 20, including or excluding optional features. In this example, the method includes manufacturing a laser projector comprising the optical system.

Example 22 is a method of operating an optical system. The method includes emitting laser beams from laser sources through respective lenses to a combiner, wherein the combiner is an optical device; combining the laser beams into a single beam at the combiner; reflecting, via a micro-electro-mechanical system (MEMS) mirror, the single beam through a window to an object; and collecting, via a single-pixel photodetector, light reflected from the object.

Example 23 includes the method of example 22, including or excluding optional features. In this example, the single-pixel photodetector is positioned such that the single-pixel photodetector is exposed only to a current projected pixel from the object and not to an entire scene, and wherein the MEMS mirror comprises a steering mirror.

Example 24 includes the method of any one of examples 22 to 23, including or excluding optional features. In this example, the laser beams comprise an infrared (IR) laser beam, a red laser beam, a green laser beam, and a blue laser beam.

Example 25 includes the method of any one of examples 22 to 24, including or excluding optional features. In this example, the method includes projecting from the single-pixel photodetector a reconstructed three-dimensional (3D) image or a reconstructed two-dimensional (2D) image comprising a multispectral image.

Example 26 includes the method of any one of examples 22 to 25, including or excluding optional features. In this example, the optical system comprises a laser projector.

Example 27 includes the method of any one of examples 22 to 26, including or excluding optional features. In this example, the optical system is a component of an electronic device.

Example 28 includes the method of any one of examples 22 to 27, including or excluding optional features. In this example, the method includes generating a projected image via the optical assembly.

Example 29 is a laser projector. The laser projector includes multiple collimating lenses to receive respective laser beams; a combiner comprising an optical device to receive the laser beams from the multiple collimating lenses and to combine the laser beams into a single beam; a micro-electro-mechanical system (MEMS) mirror to reflect the single beam from the combiner and provide a reflected beam as an exit beam through a window to an object; and a single-pixel photodetector to collect light reflected from the object.

Example 30 includes the laser projector of example 29, including or excluding optional features. In this example, the single-pixel photodetector is positioned such that the single-pixel photodetector is exposed only to a current projected pixel from the object.

Example 31 includes the laser projector of any one of examples 29 to 30, including or excluding optional features. In this example, the respective laser beams comprise a red laser beam, a green laser beam, and a blue laser beam.

Example 32 includes the laser projector of any one of examples 29 to 31, including or excluding optional features. In this example, the respective laser beams comprise an infrared (IR) laser beam.

Example 33 includes the laser projector of any one of examples 29 to 32, including or excluding optional features. In this example, the laser projector includes laser sources to provide the respective laser beams. Optionally, the laser sources comprise laser diodes comprising an infrared (IR) laser, a red laser, a green laser, and a blue laser.

Example 34 includes the laser projector of any one of examples 29 to 33, including or excluding optional features. In this example, the MEMS mirror comprises a scanning mirror, and wherein the single-pixel photodetector comprises a lens to collect light reflected from the object. Optionally, the MEMS mirror comprises a steering mirror.

Example 35 includes the laser projector of any one of examples 29 to 34, including or excluding optional features. In this example, the laser projector is configured to generate a projected image.

Example 36 includes the laser projector of any one of examples 29 to 35, including or excluding optional features. In this example, the laser projector is configured to give a reconstructed two-dimensional (2D) image from the single-pixel photodetector. Optionally, the 2D image comprises a multispectral image. Optionally, the 2D image comprises a hyperspectral image.

Example 37 includes the laser projector of any one of examples 29 to 36, including or excluding optional features. In this example, the laser projector is configured to give a reconstructed three-dimensional (3D) image via the single-pixel photodetector.

Example 38 is a method of manufacturing a laser projector. The method includes installing laser diodes; disposing multiple collimating lenses to receive laser beams from the laser diodes, respectively, and to discharge the laser beams to a combiner; providing the combiner to combine the laser beams into a single beam, wherein the combiner is an optical device; disposing a micro-electro-mechanical system (MEMS) steering mirror to reflect the single beam as an exit beam projected to an object; and positioning a single-pixel photodetector such that the single-pixel photodetector is exposed only to a current projected pixel from the object, wherein the single-pixel photodetector comprises a lens to collect the light reflected from the object.

Example 39 includes the method of example 38, including or excluding optional features. In this example, the laser beams comprise an infrared (IR) laser beam, a red laser beam, a green laser beam, and a blue laser beam.

Example 40 includes the method of any one of examples 38 to 39, including or excluding optional features. In this example, the method includes providing the laser diodes as an IR laser source, a red laser source, a green laser source, and a blue laser source, respectively.

Example 41 includes the method of any one of examples 38 to 40, including or excluding optional features. In this example, the method includes manufacturing an electronic device comprising the laser projector.

Example 42 includes the method of any one of examples 38 to 41, including or excluding optional features. In this example, the MEMS steering mirror is a scanning mirror.

Example 43 is a method of operating a laser projector. The method includes emitting laser beams from laser sources through respective collimating lenses to a combiner, wherein the combiner is an optical device; combining the laser beams into a single beam at the combiner; reflecting, via a micro-electro-mechanical system (MEMS) mirror, the single beam through a window to an object; and collecting, via a single-pixel photodetector, light reflected from the object.

Example 44 includes the method of example 43, including or excluding optional features. In this example, the single-pixel photodetector is positioned such that the single-pixel photodetector is exposed only to a current projected pixel from the object.

Example 45 includes the method of any one of examples 43 to 44, including or excluding optional features. In this example, the MEMS mirror comprises a steering mirror.

Example 46 includes the method of any one of examples 43 to 45, including or excluding optional features. In this example, the MEMS mirror comprises a scanning mirror.

Example 47 includes the method of any one of examples 43 to 46, including or excluding optional features. In this example, the laser beams comprise an infrared (IR) laser beam, a red laser beam, a green laser beam, and a blue laser beam.

Example 48 includes the method of any one of examples 43 to 47, including or excluding optional features. In this example, the method includes projecting from the single-pixel photodetector a reconstructed three-dimensional (3D) image or a reconstructed two-dimensional (2D) image comprising a multispectral image.

Example 49 is an optical system. The system includes multiple collimating lenses to receive respective laser beams; a combiner comprising an optical device to receive the laser beams from the multiple lenses and to combine the laser beams into a single beam; a micro-electro-mechanical system (MEMS) mirror to reflect the single beam from the combiner and provide a reflected beam comprising an exit beam through a window to an object; and a single-pixel photodetector to collect light reflected from the object, wherein the single-pixel photodetector is positioned to be exposed only to a current projected pixel from the object, and wherein the multiple lenses are collimating lenses.

Example 50 includes the system of example 49, including or excluding optional features. In this example, the respective laser beams comprise an infrared (IR) laser beam, a red laser beam, a green laser beam, and a blue laser beam.

Example 51 includes the system of any one of examples 49 to 50, including or excluding optional features. In this example, the system includes laser sources to provide the respective laser beams, wherein the laser sources comprise laser diodes comprising an infrared (IR) laser, a red laser, a green laser, and a blue laser.

Example 52 includes the system of any one of examples 49 to 51, including or excluding optional features. In this example, the MEMS mirror comprises a steering mirror or scanning mirror, or both, and wherein the single-pixel photodetector comprises a lens to collect light reflected from the object.

Example 53 includes the system of any one of examples 49 to 52, including or excluding optional features. In this example, the optical system is a component a laser projector to generate a projected image.

Example 54 includes the system of any one of examples 49 to 53, including or excluding optional features. In this example, the optical system comprises a laser projector to give a reconstructed two-dimensional (2D) image from the single-pixel photodetector, wherein the 2D image comprises a multispectral image or hyperspectral image.

Example 55 includes the system of any one of examples 49 to 54, including or excluding optional features. In this example, the optical system comprises a laser projector to give a reconstructed three-dimensional (3D) image via the single-pixel photodetector.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An optical system comprising:
   multiple lenses to receive respective laser beams;
   a combiner comprising an optical device to receive the laser beams from the multiple lenses and to combine the laser beams into a single beam, wherein the laser beams comprise an infrared (IR) laser beam, a red laser beam, a green laser beam, and a blue laser beam;

a micro-electro-mechanical system (MEMS) mirror to reflect the single beam from the combiner and provide a reflected beam comprising an exit beam through a window to an object; and a single-pixel photodetector to collect light reflected from the object, wherein the single-pixel photodetector is positioned behind the MEMS mirror such that light reflected from the object passes through the window, is then reflected by the MEMS mirror to the combiner, and then directed by the combiner to the single-pixel photodetector.

2. The optical system of claim 1, wherein the multiple lenses are collimating lenses.

3. The optical system of claim 1, comprising laser sources to provide the respective laser beams, wherein the laser sources comprise laser diodes comprising an infrared (IR) laser, a red laser, a green laser, and a blue laser.

4. The optical system of claim 1, wherein the MEMS mirror comprises a steering/scanning mirror, and wherein the single-pixel photodetector comprises a lens to collect light reflected from the object.

5. The optical system of claim 1, wherein the optical system is a component of a laser projector to create a projected image.

6. The optical system of claim 1, wherein the optical system comprises a laser projector to give a reconstructed two-dimensional (2D) image from the single-pixel photodetector, wherein the 2D image comprises a multispectral image or hyperspectral image.

7. The optical system of claim 1, wherein the optical system comprises a laser projector to give a reconstructed three-dimensional (3D) image via the single-pixel photodetector.

8. An electronic device comprising:
a processor and memory; and
an optical system comprising:
multiple collimating lenses to receive respective laser beams;
a combiner comprising an optical device to receive the laser beams from the multiple lenses and to combine the laser beams into a single beam, wherein the laser beams comprise an infrared (IR) laser beam, a red laser beam, a green laser beam, and a blue laser beam;
a micro-electro-mechanical system (MEMS) mirror to reflect the single beam from the combiner and provide a reflected beam comprising an exit beam through a window to an object; and
a single-pixel photodetector to collect light reflected from the object, wherein the single-pixel photodetector is positioned behind the MEMS mirror such that light reflected from the object passes through the window, is then reflected by the MEMS mirror to the combiner, and then directed by the combiner to the single-pixel photodetector.

9. The electronic device of claim 8, comprising laser sources to provide the respective laser beams, wherein the laser sources comprise laser diodes comprising an infrared (IR) laser, a red laser, a green laser, and a blue laser.

10. The electronic device of claim 8, wherein the MEMS mirror comprises a steering mirror, and wherein the single-pixel photodetector comprises a lens to collect the light reflected from the object.

11. The electronic device of claim 8, wherein the electronic device comprises a laser projector to create a projected image.

12. The electronic device of claim 8, wherein the electronic device comprises a laser projector to give a reconstructed two-dimensional (2D) image from the single-pixel photodetector, wherein the 2D image comprises a multispectral image or hyperspectral image.

13. The electronic device of claim 8, wherein the electronic device comprises a laser projector to give a reconstructed three-dimensional (3D) image via the single-pixel photodetector.

14. The electronic device of claim 8, wherein the electronic device comprises a computing device.

15. A method of manufacturing an optical system, comprising:
disposing multiple collimating lenses to receive laser beams from laser diodes, respectively, and to discharge the laser beams to a combiner;
providing the combiner to combine the laser beams into a single beam, wherein the laser beams comprise an infrared (IR) laser beam, a red laser beam, a green laser beam, and a blue laser beam, and wherein the combiner is an optical device;
disposing a micro-electro-mechanical system (MEMS) steering mirror to reflect the single beam as an exit beam projected to an object; and
positioning a single-pixel photodetector such that the single-pixel photodetector is exposed only to a current projected pixel from the object and not to an entire scene, wherein the single-pixel photodetector is positioned behind the MEMS mirror such that light reflected from the object passes through the window, is then reflected by the MEMS mirror to the combiner, and then directed by the combiner to the single-pixel photodetector, and wherein the single-pixel photodetector comprises a lens to collect the light reflected from the object.

16. The method of claim 15, comprising providing the laser diodes as an IR laser source, a red laser source, a green laser source, and a blue laser source, respectively.

17. The method of claim 15, comprising manufacturing a laser projector comprising the optical system.

18. A method of operating an optical system, comprising:
emitting laser beams from laser sources through respective lenses to a combiner, wherein the combiner is an optical device;
combining the laser beams into a single beam at the combiner, wherein the respective laser beams comprise an infrared (IR) laser beam, a red laser beam, a green laser beam, and a blue laser beam;
reflecting, via a micro-electro-mechanical system (MEMS) mirror, the single beam through a window to an object; and
receiving light reflected from the object through the window and reflecting, via the MEMS mirror, the light to the combiner;
directing the light from the combiner to a single-pixel photodetector positioned behind the MEMS mirror; and
collecting, via the single-pixel photodetector, the light reflected from the object.

19. The method of claim 18, wherein the MEMS mirror comprises a steering mirror.

20. The method of claim 18, comprising projecting from the single-pixel photodetector a reconstructed three-dimensional (3D) image or a reconstructed two-dimensional (2D) image comprising a multispectral image.

* * * * *